United States Patent [19]

Birman et al.

[11] Patent Number: 5,257,258
[45] Date of Patent: Oct. 26, 1993

[54] "LEAST TIME TO REACH BOUND" SERVICE POLICY FOR BUFFER SYSTEMS

[75] Inventors: Alexander Birman, Chappaqua; Harry R. Gail, Jr., Ossining; Sidney L. Hantler, Peekskill, all of N.Y.

[73] Assignee: International Business Machines Corporation, Armonk, N.Y.

[21] Appl. No.: 656,934

[22] Filed: Feb. 15, 1991

[51] Int. Cl.$^5$ ............................................. H04J 3/26
[52] U.S. Cl. ..................................... 370/60; 370/61; 370/94.1
[58] Field of Search ................. 370/60, 94.1, 58.2, 370/61, 85.1, 85.6

[56] References Cited

U.S. PATENT DOCUMENTS

| | | |
|---|---|---|
| 4,317,195 | 2/1982 | Barberis et al. ................. 370/94.1 |
| 4,499,576 | 2/1985 | Fraser ................................ 370/94.1 |
| 4,700,340 | 10/1987 | Beranek et al. ................... 370/60 |
| 4,839,891 | 6/1989 | Kobayashi et al. ................ 370/94.1 |

OTHER PUBLICATIONS

Mischa Schwartz, Telecommunication Network, 1987 pp. 47-52.
Telecommunication Networks: Protocols, Modeling and Analysis, Mischa Schwartz, pp. 40-43.

Primary Examiner—Douglas W. Olms
Assistant Examiner—Melvin Marcelo
Attorney, Agent, or Firm—Douglas W. Cameron

[57] ABSTRACT

This invention describes a method and apparatus for serving the buffers of a buffer system to avoid overflow of buffers. More specifically, this invention describes which buffers of the system should be first selected for servicing so as to avoid overflow. In addition, with this invention, the buffer size of each buffer in the system is independent of the number of links of the system.

25 Claims, 7 Drawing Sheets

"LEAST TIME TO REACH BOUND" SERVICE POLICY FOR BUFFER SYSTEMS

DESCRIPTION

1. Technical Field

This invention describes a service policy for serving a number of buffers associated with the links of a buffer system in a digital communications network. More specifically, with this invention, the required buffer size is the smallest possible and is independent of the number of links and their relative speeds.

2. Description of the Prior Art

Data, voice or video is often transmitted in the form of digitized messages, or packets, which are exchanged among multiple sources via a packet switching network having a number of switching nodes, or simply nodes, which are inter-connected by communication channels or links. A link is any transmission medium used to transmit information bits. A link is called an input link with respect to a system if the bits of information flow toward the system. Otherwise the link is called an output link.

A buffer system, of which a packet switching node of a packet switching network is an example, is a system having two or more links with each j-th link having a speed of $S_j$. Each link also has a distinct associated buffer, which in the case of an input link is used to store bits arriving from the associated input link, and which in the case of output links, is used to transfer bits from the buffer to the associated output link. In the case of an input link and its associated buffer, serving the buffer implies that bits are transferred out of the buffer so there is storage space in the buffer to receive bits from the input link. Service of a buffer which is associated with an output link means storing bits in the buffer so there are bits in the buffer to depart on the output link.

A node, for example, may have two or more input links which carry packets arriving at the node while having one or more output links which carry packets departing from the node. Each link is characterized by its speed, measured in bits/bytes -per-second, which represents the rate at which bits/bytes of packets are transmitted over it. On some links, bits/bytes of a packet may arrive without interruption; such a link is known as an uninterruptible link. Otherwise, the link is interruptible.

Associated with every link is a storage unit, or a buffer which is used to store bits/bytes of a packet arriving from an input link, or bits/bytes of a packet to depart on a corresponding output link.

Each node of the network typically has a device known as a server which transfers packets into or out of the buffers of the node. In the case of packets arriving from an input link of the node, the server empties the buffer. In the case of packets departing on an output link the server fills the buffer. Thus, given a buffer system, buffer service on buffer 1 may require emptying the buffer while service on buffer 2 may require filling the buffer.

The buffers of this network must be sufficiently large so as to avoid, or at least limit, loss of bits which may occur if at any time, for some pattern of packet arrivals from the input links, the buffer storage is exhausted and any additional arriving bits are lost. This event is known as overflow.

Alternatively, in the case of buffers associated with output links, the buffers must be sufficiently large so as to avoid the situation wherein the server is ready to place bits in the buffer and there is no storage space left in the buffer.

Since networks constantly change, the number of links in a node and/or the speed of these links may change from time to time. When change occurs, it is important that existing components need not be replaced. Thus, for buffer systems it is desirable that the size of buffers be independent of input links and their relative speed. It is also desirable, for economic reasons, to minimize the size of these buffers.

With existing service policies [1], such as first come first serve (FCFS) or exhaustive round robin (RR), the size of the buffers grows without bound as the number of links and their relative speeds increase. Thus, with the usage of these service policies, overflow can only be eliminated by changing the buffers in the network when the network configuration is changed.

There are also buffer service systems in which the service period starts before all of the bits of a packet are present in a buffer [2]. In the case of a buffer associated with an input link, a buffer is said to have an essentially complete packet if there are sufficient bits in the buffer to insure that in the next service period the server can transfer an entire packet without interruption. The server can transfer an entire packet without interruption if it is not the case that the server has transferred only part of the packet and there are no more bits in the buffer. In the case of a buffer associated with an output link, a buffer has essentially sufficient free storage if there is enough free storage to insure that in the next service period the server can transfer an entire packet without interruption. The server can transfer an entire packet without interruption if it is not the case that the server has transferred only part of the packet and there is no more free storage in the buffer.

U.S. Pat. No. 4,378,588 to Katzmann et al teaches combining buffers with incoming and outgoing traffic which are served by the same server.

SUMMARY OF THE INVENTION

It is, therefore, an object of this invention to provide a service policy for a buffer system. More specifically, it is a further object of this invention to provide a service policy which eliminates the possibility of overflow, requires a minimal buffer size, and which is independent of the number of links and their relative speeds.

Accordingly, this invention provides a method/apparatus for serving buffers associated with links of a buffer system. This invention requires determining $\theta_M$ which is the minimum value of $\theta_j$ for a subset of buffers. Each buffer in the subset has at least an essentially complete packet therein if its bits are arriving from its associated input link, and each buffer in the subset has essentially sufficient free storage if bits are departing from the buffer. In the case of a buffer being associated with an input link, $\theta_j$ is the time needed for the j-th buffer to reach its bound if bits are arriving in the j-th buffer from the associated link. In the case of a buffer being associated with an output link, $\theta_j$ is the time needed for the j-th buffer to become empty if bits are departing from the j-th buffer onto the associated output link. Then, any buffer in the subset having a value of $\theta_j=\theta_M$ is served, where serving a buffer comprises taking bits out of a buffer associated with an input link or storing bits in a buffer associated with an output link.

Alternatively, the parameter $\theta_F$ could be determined where $\theta_F$ is the minimum value of $\theta_j$ for a buffer in a different subset of buffers. Each buffer in the latter subset has at least M bytes therein if bits are arriving in the buffer from its associated input link, and each buffer in the latter subset has at least M bytes of free storage if bits are departing from that buffer onto an associated output link.

Then, any buffer having a value of $\theta_j \leq \theta_F$ and having essentially sufficient free storage if the buffer is associated with an output link, and having at least an essentially complete packet if the buffer is associated with an input link is served.

Let N be the number of input links of the node, and $S_j$ be the speed of the j-th link where $1 \leq j \leq N$, and let S be the speed of the server where $$S \geq \sum_j S_j$$

On an uninterruptible link, a packet of length L is essentially complete when at least $L(1-S_j/S)$ of its bits/bytes have arrived at a buffer. If the length of the packet is not known until all its bits/bytes have arrived, a packet on an uninterruptible link is essentially complete when at least $M(1-S_j/S)$ of its bytes have arrived at the j-th buffer. A buffer is said to have a complete packet therein if all of the bits/bytes of the packet have arrived at the corresponding buffer.

If a buffer size of 2M is used for each of the j-th buffers, and either of the service policies are used above, the possibility of overflow is eliminated.

DESCRIPTION OF THE PREFERRED EMBODIMENT

Figure 1:
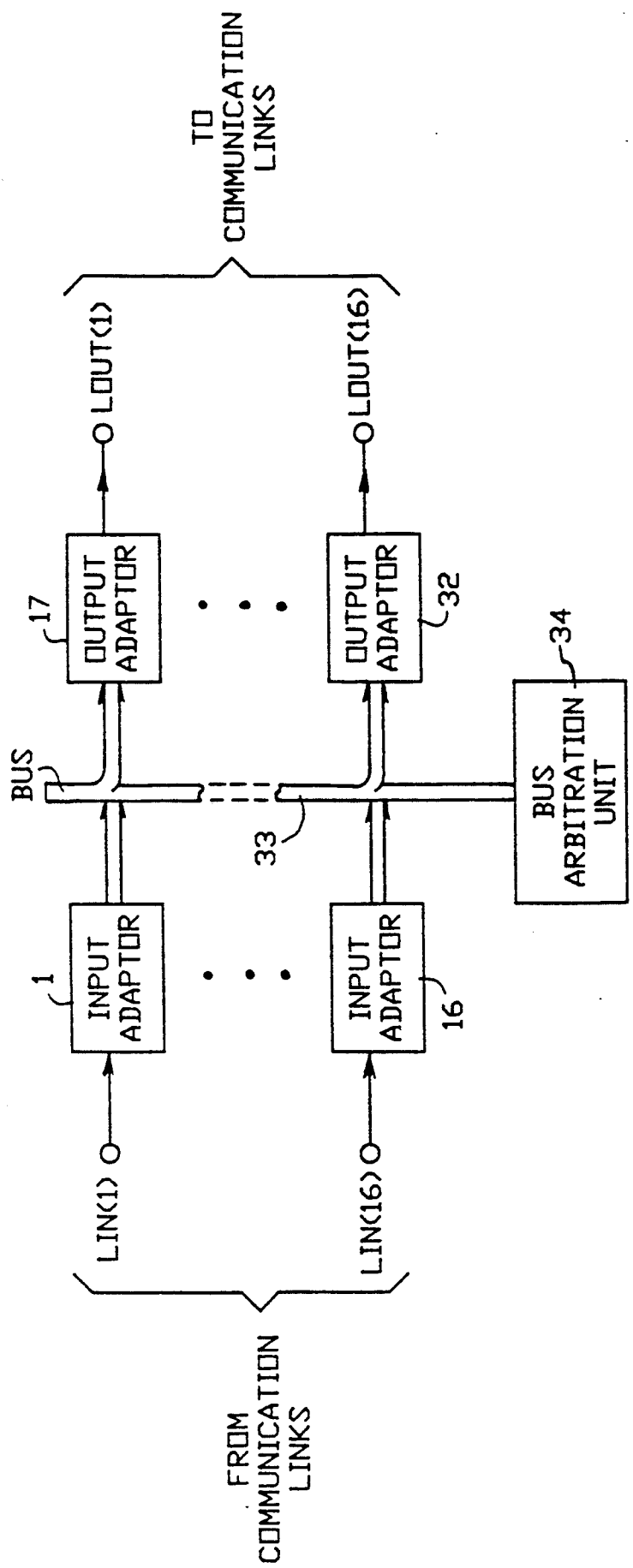
FIG. 1. is a schematic representation of the packet switching device (a buffer system) used in this invention.

With reference to FIG. 1, the packet switching device (a buffer system) is connected to 16 bidirectional communication links through two sets of terminals: terminals LIN(1) through LIN(16) for the incoming channels for the communication links and terminals LOUT(1) through LOUT(16) for the outgoing channels of the communication links. For the preferred embodiment it is assumed that the communication links are uninterruptible and that the length of a packet is not know until all its bits have arrived.

The function of Input Adaptors 1 through 16 is to receive the incoming packet traffic over the communication links in the form of bit-serial streams, to identify the beginning and end of packets, to store these packets in dedicated storage devices (buffers) within the Input Adaptors, to communicate with Bus Arbitration Unit 34 over Bus 33 in preparation for the transfer of the stored packets out of the Input Adaptors, and finally to transfer the stored packets at the appropriate times to Bus 33. The operation of the Input Adaptors is further detailed in FIG. 2.

Bus 33 serves as the medium for communication among Input Adaptors 1 through 16, Output Adaptors 17 through 32 and Bus Arbitration Unit 34. Both control signals and packets are carried by the Bus.

The function of Output Adaptors 17 through 32 is to communicate with Bus Arbitration Unit 34 in preparation for the transfer of packets from Bus 33 to the Output Adaptors, to transfer packets from Bus 33 to the Output Adaptors, and to store the arriving packets until these can be transferred to the outgoing channels of the communication links through ports LOUT(1) through LOUT(16).

The function of Bus Arbitration Unit 34 is to communicate with the Input Adaptors and the Output Adaptors in preparation for the transfer of packets over Bus 33. The operation of the Bus Arbitration Unit is further detailed in FIG. 3.

Figure 2:
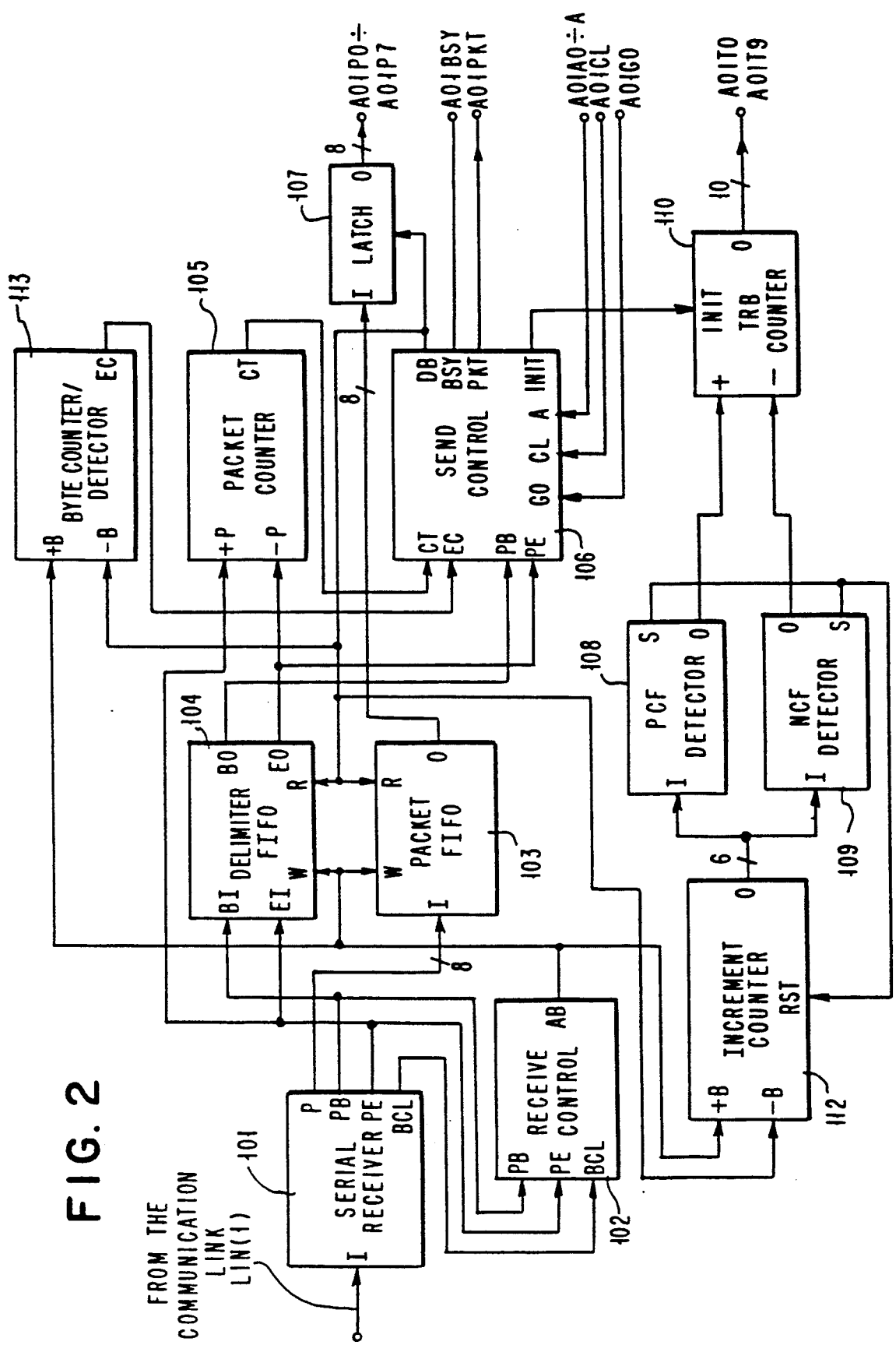
FIG. 2 is a schematic representation of the input adaptor used in this invention which uses $\theta_M$ (hereinafter referred to as the MIN Algorithm).

We turn now to FIG. 2 illustrating the internal structure of Input Adaptor 1 (FIG. 1), structure which is representative of Input Adaptors 1 through 16. The buffer service policy here is according to the MIN algorithm.

Port LIN(1) is the point at which the arriving bit stream over the communication link enters Input Adaptor 1. Port LIN(1) is connected by a link to the I input of Serial Receive 101. The function of Serial Receive 101 is to identify the beginning and end of packets and to convert the bit-serial stream to a parallel stream of 8-bit bytes. As a result Serial Receive 101 produces the following signals: at output P an 8-bit signal representing the current byte of the arriving packet (if any), at output PB a signal which, when activated, signifies that the byte at output P is the first byte of a packet, at output PE a signal which signifies that the byte at output P is the last byte of a packet, and at output BCL a signal which signifies that a valid byte is found at output P.

Receive Control 102 controls the transfer of packets from Serial Receiver 101 to the Packet FIFO 103 (a buffer) where the bytes are stored. Toward this purpose the signals produced by Serial Receiver 101 at outputs BCL, PB and PE are carried by links to the corresponding inputs of Receive Control 102, while the byte at output P of the Serial Receiver is carried by a link to input I of Packet FIFO 103. At the appropriate time a signal at output AB of the Receive Control is used to activate the W input of the Packet FIFO which causes the byte at input I to be stored.

Delimiter FIFO 104 stores two bits for every byte stored in the Packet FIFO, which bits originate at outputs PB and PE of the Serial Receive. The bit corresponding to input BI is '1' if the signal at BI is activated, which means that the byte being stored in Packet FIFO 103 is the first byte of a packet. Similarly, the bit corresponding to input EI marks the last byte of a packet. The control of the writing operation into Delimiter FIFO 104 is controlled by Receive Control 102 through the signal at its AB output which is carried by a link to input W of Delimiter FIFO 104.

The transfer of a packet from the Packet FIFO (service of the buffer) to ports A01P0 through A01P7 is controlled by Send Control 106 through the signal at its DB output. This signal, which is carried by a link to the R input of the Packet FIFO, when activated causes a read operation from the FIFO memory of Packet FIFO 103 and results in a byte being transferred from the O output of the Packet FIFO over an 8-bit link to the I input of Latch 107. The byte is then stored in the Latch due to its S input being activated by the same signal originating at the DB output of the Send Control. Then the byte is carried from output O of Latch 107 by an 8-bit link to ports A01P0 through A01P7.

The initiation of a packet transfer operation from the Packet FIFO to the Bus as described above is conditioned on: a) Send Control 106 recognizes its address, a binary number between 0000 and 1111, at its A input which originates at ports A01A0 through A01A3; and b) Send Control 106 detects its GO input active, a signal which originates at Bus Arbitration Unit 34 and represents the go-ahead for packet transfer (the Input Adaptor has thus received control of the bus from the Bus Arbitration unit). Then Send Control 106 activates output BSY (taking control of the Bus) whose signal is carried to the A01BSY port.

The termination of a packet transfer operation is triggered when the last byte of a packet is read from Packet FIFO 103, and simultaneously output EO of Delimiter FIFO 104 is activated. Consequently Send Control 106 which recognizes the activation of its PE input will, after the byte has been transferred to Latch 107, deactivate its BSY line to signal to the Bus Arbitration Unit the end of the transfer.

The contents of TRB Counter 110 approximate the Time-to-reach-bound (TRB) $\theta_1$ (the TRB for Input Adaptor j is denoted by $\theta_j$). The operation of the TRB Counter involves three parameters: one parameter whose value is the same for all Input Adaptors, and two parameters whose values may be distinct for different Input Adaptors.

The first parameter, denoted by U, represents the time interval corresponding to a unit count of TRB Counter 110. In other words, we take the contents of the TRB Counter to represent an integer, say $N_i$ for Input Adaptor i, such that $\theta_i = N_i U$ where U is the time corresponding to a unit count in the TRB Counter. We assume the TRB Counters in different Input Adaptors have the same length (in bits) and the same parameter U.

The other two parameters may have distinct values for different adaptors. Let $V_i$, $i=1,\ldots,16$, denote the contents of the TRB Counter on Input Adaptor i at start-up time (time the power is turned on). Let $F_i$, $i=1, \ldots, 16$, denote an integer characterizing Input Adaptor i which is defined as follows. Whenever the Packet FIFO on Input Adaptor i increases by $F_i$ bytes the TRB Counter is decreased by one. Furthermore, whenever the Packet FIFO on Input Adaptor i decreases by $F_i$ bytes the TRB Counter is increased by one. We refer to $F_i$ as the Counting Factor for Input Adaptor i.

First we show how to determine U. Let $S_F$ be the smallest of all $S_i$, where $S_i$ is the speed of the i-th communication link, $i=1,\ldots,16$. The largest TRB value which needs to be stored in any TRB Counter occurs on an adaptor corresponding to that link speed and its value is $2M/S_F$ where M is the length in bits of the largest packet (the maximum message size transmitted through the buffer system) Let b be the length in bits of the TRB Counter. Since TRB's are non-negative the largest value which can be stored in the TRB Counter is $2^b - 1$. We thus have $U(2^b-1) \geq 2M/S_F$ or $$U \geq \frac{2M}{S_F(2^b - 1)}$$

At start-up time all Packet FIFO's are empty and using the definition of the TRB with $Q_j = 0$ we get $V_i \cdot U = 2M/S_i$. Thus, the initial value of the TRB Counter on adaptor i is $$V_i = \frac{2M}{US_i}.$$

TRB Counter 110 is set to $V_i$ at start-up time by the signal at the INIT output of Send Control 106.

Let $Q_j$ be again the contents of the Packet FIFO on the i-th adaptor at some arbitrary time, let $N_i$ be the value of the TRB Counter. From the definition of the TRB it follows $$N_i U = \frac{2M - Q_i}{S_i}.$$

Using now the definition of the Counting Factor $F_i$ we have $$(1 + N_i)U = \frac{2M - (Q_i - F_i)}{S_i}.$$

Then the Counting Factor for adaptor i is $F_i = US_i$.

Assume the speed $S_i$, $i = 1, \ldots, 16$, is a multiple of $S_F$, that is $S_i = \alpha_i S_F$ for some integer $\alpha_i$. When we refer to $S_i$ we have in mind the rate at which information (packet) bits arrive at the Input Adaptor. This speed may be slightly different from the speed of bits streams within the medium used in the communication links. The digital hierarchy used by common carriers, for example, is structured in multiples of equivalent voice circuits: DS-0 at 64 kbits/sec has 1 circuit, DS-1 at 1.544 Mbits/sec has 24 circuits, DS-1C at 3.152 Mbits/sec has 48 circuits, and so on. Consequently, if we make sure that $US_F$ is an integer then $US_i$ will also be an integer for $i = 1, \ldots, 16$.

Here we take $M = 1000$ bytes, $b = 10$ bits. Let $S_{max}$ be the largest of the link speeds and let $S_{max}/S_F = 28$. We infer that for an adaptor i with $S_i = S_F$ we have $US_F \geq 2M/(2^b - 1)$. We choose the counting factor to be the smallest integer which is larger or equal to $2M/(2^b - 1)$, in this case $F_i = 2$. For the adaptor, say j, with $S_j = S_{max}$ we have $F_j = US_{max} = 28US_F = 56$. The counting factors for all other adaptors will be integers between 2 and 56.

TRB Counter 110 is incremented (decremented) by one every time Packet FIFO 103 decreases (increases) by $F_i$. The updating of TRB Counter 110 is done by Increment Counter 112, PCF Detector 108 and NCF Detector 109. "PCF Detector" and "NCF Detector" stand for Positive Counting Factor Detector and Negative Counting Factor Detector, respectively. Referring to Input Adaptor 1 we show now exactly how this is accomplished.

Increment Counter 112 is an up/down counter which is incremented by one every time a byte is stored in Packet FIFO 103 and which is decremented by one every time a byte is retrieved from Packet FIFO 103.

The incrementing signal originates at output AB of Receive Control 102. The decrementing signal originates at output DB of Send Control 106. Since the largest number which needs to be accommodated by Increment Counter 112 is 56 (as explained above) it follows that Increment Counter 112 is 6 bits long.

PCF Detector 108 consists of logical circuitry which detects a count of $F_1$ in Increment Counter 112. When this happens Increment Counter 112 is reset to zero by having a reset signal travel from the S output of PCF Detector 108 to input RST of Increment Counter 112. Moreover PCF Detector 108 causes the +input of TRB Counter 110 to be activated. NCF Detector 109 consists of logical circuitry which detects a count of $-F_1$ in Increment Counter 112. When this happens Increment Counter 112 is reset to zero and the −input of TRB Counter 110 is activated as before.

Packet Counter 105 is an up/down counter which holds the number of packets in Packet FIFO 103. Its +P input is activated by the "end of packet received" signal at output PE of Serial Receive 101. Its −P input is activated by the "end of packet sent" signal at output EO of the Delimiter FIFO. The signal at its CT output, which signifies that the current count is non-zero, travels on a link to input CT of Send Control 106.

Byte Counter/Detector 113 is an up/down counter which holds the count of the bytes stored in Packet FIFO 103. Its +B input is activated by the signal at output AB of Receive Control 102. Its −B input is activated by the signal at output DB of Send Control 106. Its EC output is activated whenever the count of bytes shows Packet FIFO 103 has an essentially complete packet as explained below.

Let $x_i$ be such that if the buffer on link i contains at least $x_i$ bits then it contains an essentially complete packet. With the assumptions that the communication link is uninterruptible and that the length of the packet is not known until all its bits have arrived, the time required to serve M bits equals the time needed for the rest of the packet to arrive:

$$\frac{M}{S} = \frac{M - x_i}{S_i} \quad \text{or} \quad x_i = M\left(1 - \frac{S_i}{S}\right)$$

where $S_i$ is the link speed and S is the speed of the server. If M is given in bytes then $x_i$ will also be expressed in bytes. For example, if M=1000 bytes and $S_i/S=0.1$ then $x_i=900$ bytes.

In some cases the length of the packet is known before all its bits have arrived, as for example when the length of every packet is encoded in its first few bytes. Then the scheme described here can be extended as follows. The value $x_i$ has a similar formula to the one above except that M is replaced by the actual length of the packet, say L. Since $x_i$ varies with L it has to be recomputed for every arriving packet and its value supplied to Byte Counter 113.

The logic in Byte Counter/Detector 113 activates output EC whenever the count is higher than $x_1$ (the value $x_i$ depends on the link speed and therefore may vary from one adaptor to the next). Every clock cycle (see CL input) Send Control 106 activates its PKT output if either its CT input is activated (Packet Counter 105 shows there is at least one complete packet) or if its EC input is activated (Byte Counter 113 shows there is an essentially complete packet). The signal at the PKT output is carried by a link to port A01PKT.

Figure 3:
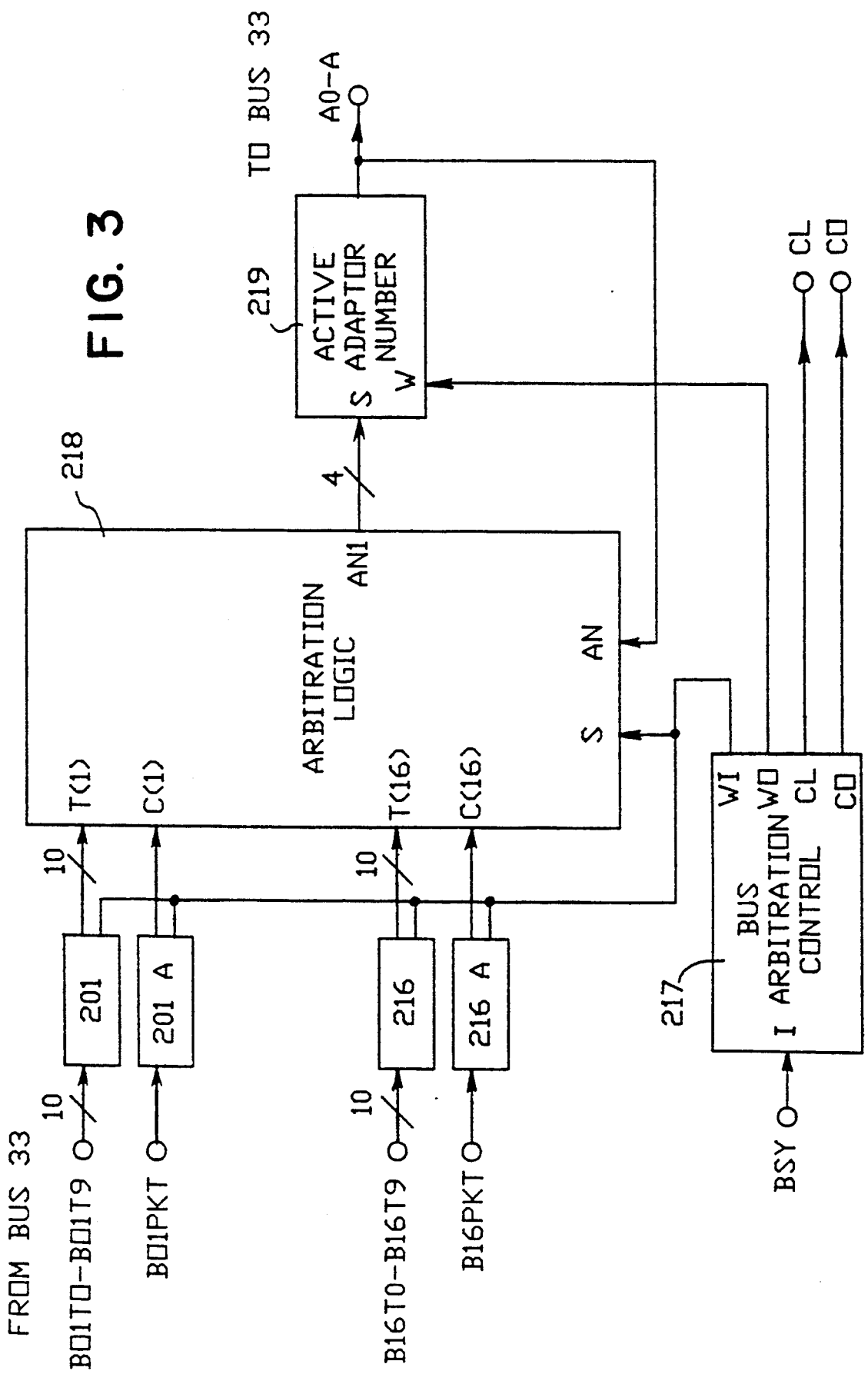
FIG. 3. is a schematic representation of the bus arbitration unit used in this invention using the MIN Algorithm.

We turn now to FIG. 3 which illustrates the internal structure of Bus Arbitration Unit 34 from FIG. 1. The buffer service policy here is according to the MIN algorithm.

Ports B01T0 through B01T9 of Bus Arbitration Unit 34 are linked by Bus 33 to ports A01T0 through A01T9 of Input Adaptor 1 (see FIG. 2). The 10-bit number at these ports corresponds to the TRB for Input Adaptor 1. Similar links exist for all other Input Adaptors. These 16 10-digit numbers are periodically stored in Latches 201 through 216 under the control of Bus Arbitration Control 217 through the signal at its output WI. The contents of these Latches are carried by links to inputs T(1) through T(16) of Arbitration Logic 218.

Port B01PKT of Bus Arbitration Unit 34 is linked by Bus 33 to port A01PKT of Input Adaptor 1 (see FIG. 2). This signal gets activated whenever Input Adaptor 1 has at least one complete packet or has an essentially complete packet and thus is a candidate for service in the next service period. Similar links exist for all other Input Adaptors. These 16 one-bit signals are periodically stored in Latches 201A through 216A under the control of Bus Arbitration Control 217 through the signal at its output WI. The contents of these Latches are carried by links to inputs C(1) through C(16) of Arbitration Logic 218.

Arbitration Logic 218 consists of circuitry which selects the buffer to be served next according to the MIN algorithm (see FIG. 4 below). Output AN1 of Arbitration Logic 218 is a 4-bit number representing the adaptor number to be served in the next service period.

Bus Arbitration Control 217 detects the end of a packet transfer by determining whether the signal at its input I is active (Input I is linked to port BSY of Bus Arbitration Unit 34 and the BSY output of the send Control Unit). When BSY turns from active to inactive this shows that the Input Adaptor which had control of the bus has now relinquished it. The AN1 output of Arbitration Logic 218 is then stored into a Latch marked Active Adaptor Number 219 under the control of Bus Arbitration Control 217 through its WO output signal. Then Bus Arbitration Control activates its GO output which is the go-ahead signal for the input adaptor designated in 219 to acquire control of the bus. A clocking signal is also generated at the CL output which provides timing for all bus operations.

Bus 33 (FIG. 1) consists of a set of wires which links ports on Input Adaptors 1 through 16, on Output Adaptors 17 through 32 and on Bus Arbitration Unit 34. Specifically, ports A0 through A3, M, CL, BSY on the Bus Arbitration Unit are linked to ports A01A0 through A01A3, A01M, A01CL, A01BSY on Input Adaptor 1 and similar ports on Input Adaptors 2 through 16. In addition, ports B01T0 through B01T9 on the Bus Arbitration Unit are linked to ports A01T0 through A01T9 on Input Adaptor 1; ports B02T0 through B02T9 on the Bus Arbitration Unit are linked to ports A02T0 through A02T9 on Input Adaptor 2; and so on.

Figure 4:
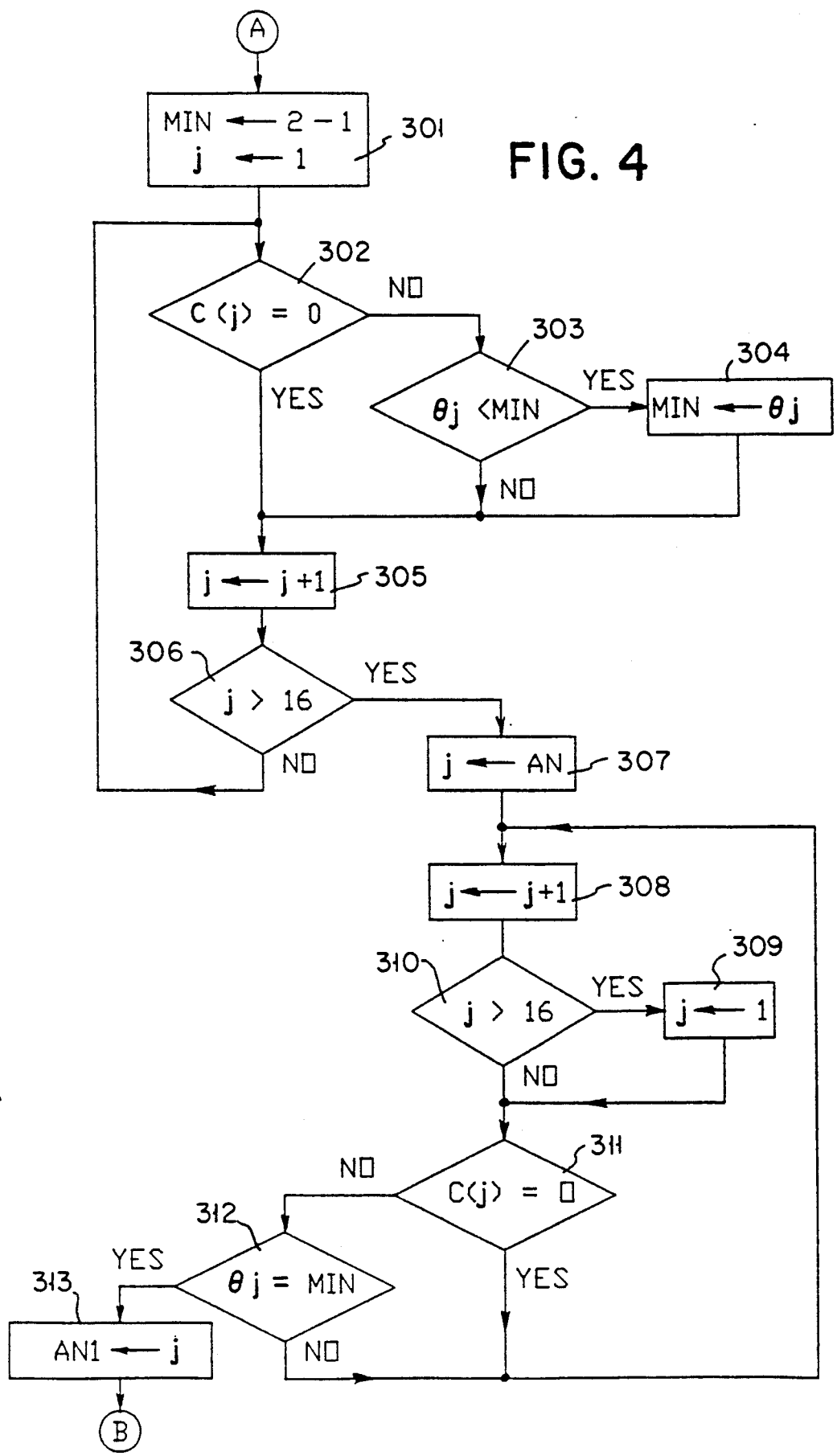
FIG. 4. is a flowchart for the arbitration logic of the MIN Algorithm.

We turn now to FIG. 4 which illustrates in block diagram form the MIN algorithm implemented by Arbitration Logic 218 of FIG. 3. Here $\theta_1$ through $\theta_{16}$ represent the values of the 10-bit numbers at inputs T(1) through T(16) of FIG. 3, C(1) through C(16) represent the binary values of inputs C(1) through C(16) of FIG. 3 (the value is 1 if the corresponding input signal is activated). AN and AN1 represent the values of the 4-bit input AN and output AN1, respectively, of FIG. 3. The symbols j and MIN are variables used in the computation: j takes values 1 through 16 while MIN is used to calculate the minimum TRB $\theta_j$ value from a set of TRB's ($\theta_{j+5}$). The computation, which is performed repetitively under the control of Bus Arbitration Control 217 of FIG. 3, starts at A (FIG. 4).

In step 301 variables MIN and j are initialized. Variable j gets value 1 while MIN is assigned the largest value which can be stored in a 10-bit binary register, namely $2^{10}-1$. At step 302 condition C(I) is checked. If C(I)=0 this means that the j-th input adaptor does not participate in the determination of $\theta_M$ and steps 303 and 304 are skipped, the computation proceeding directly to step 305. If, however, C(I)=1 then the computation proceeds to step 303 where MIN is compared with $\theta_1$. If $\theta_1$ is the smaller of the two then at step 304 MIN gets a new value, namely the value of $\theta_1$. Otherwise the MIN remains unchanged and the computation proceeds directly to step 305. At step 305 I is incremented by one. At step 306 the value of j is checked. If j is larger than 16 then the computation proceeds to step 307; otherwise the computation returns to step 302. At this point in the computation the value of MIN is $\theta_M$.

At step 307, j is assigned the value of AN, the number of the currently active input adaptor. At step 308 the value of j is incremented by one. At step 309 the value of j is checked. If j is larger than 16 then at step 309, j is assigned the value j and the computation proceeds to step 311; otherwise the computation proceeds directly to step 311. At step 311 the condition C(j) is checked. If zero then the computation returns to step 308; otherwise the computation proceeds to step 312. At step 312 the value j is compared against the value of MIN. If the two are equal then j is the number of the adaptor to be served next and the value of j is assigned to AN1 at step 313; otherwise the computation returns to step 308. Following step 313 the computation terminates.

Figure 5:
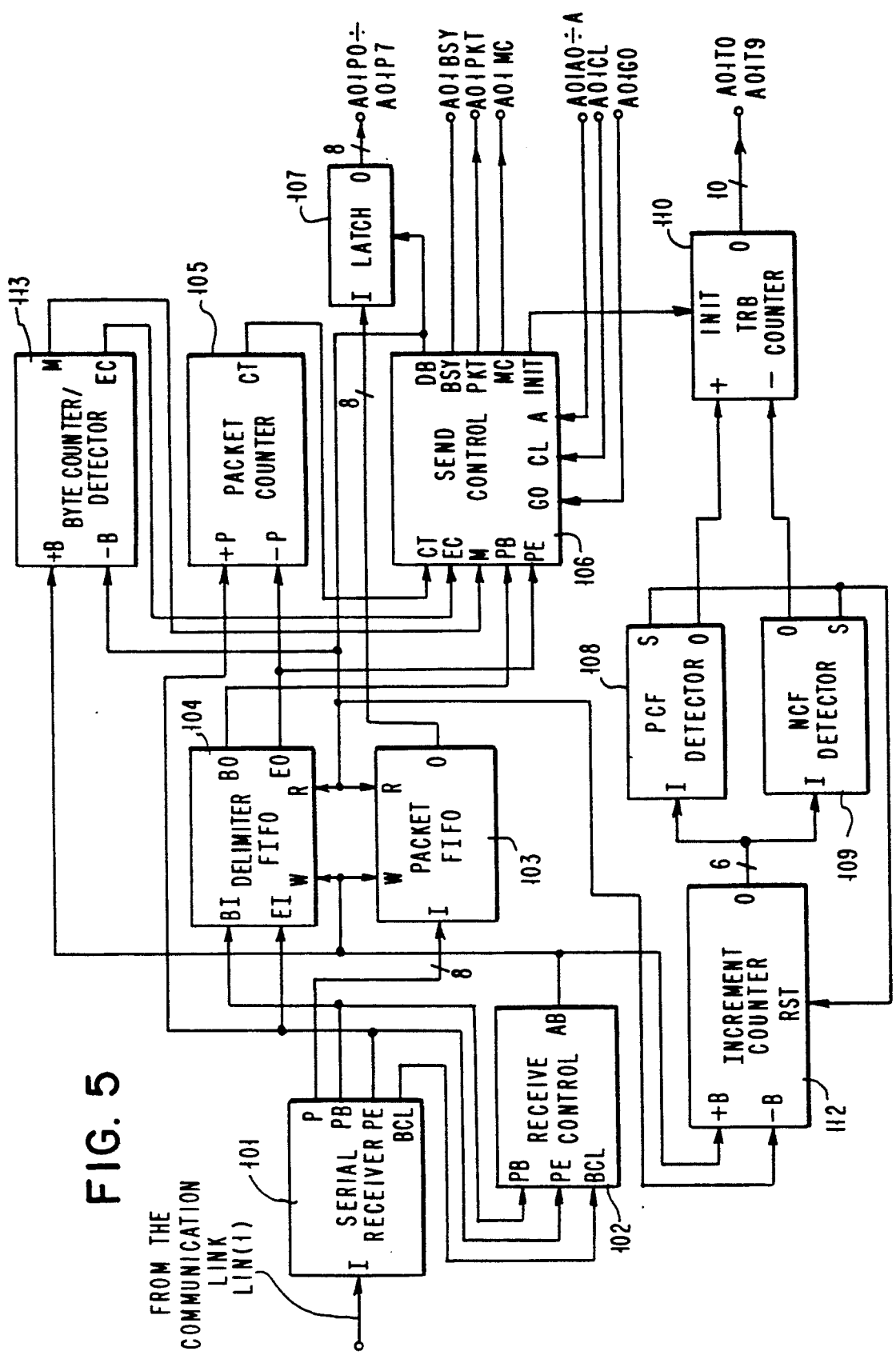
FIG. 5. is a schematic representation of the input adaptor used in this invention which uses $\theta_F$ (hereinafter referred to as the FULL Algorithm).

We turn now to FIG. 5 which illustrates the internal structure of Input Adaptor 1 with the FULL algorithm. Since the structure of the Input Adaptor with the FULL algorithm is very similar to the one in FIG. 2 (using MIN algorithm) we will describe only the differences between the two.

Byte Counter/Detector 113 has an additional output M which is activated whenever the number of bytes in the counter is equal or larger than the value of parameter M. This signal is carried by a link to the M input of Send Control 106. Every clock cycle (see input CL) Send Control 106 will activate its MC output if input M is activated. The MC signal is carried by a link to port A01MC.

Figure 6:
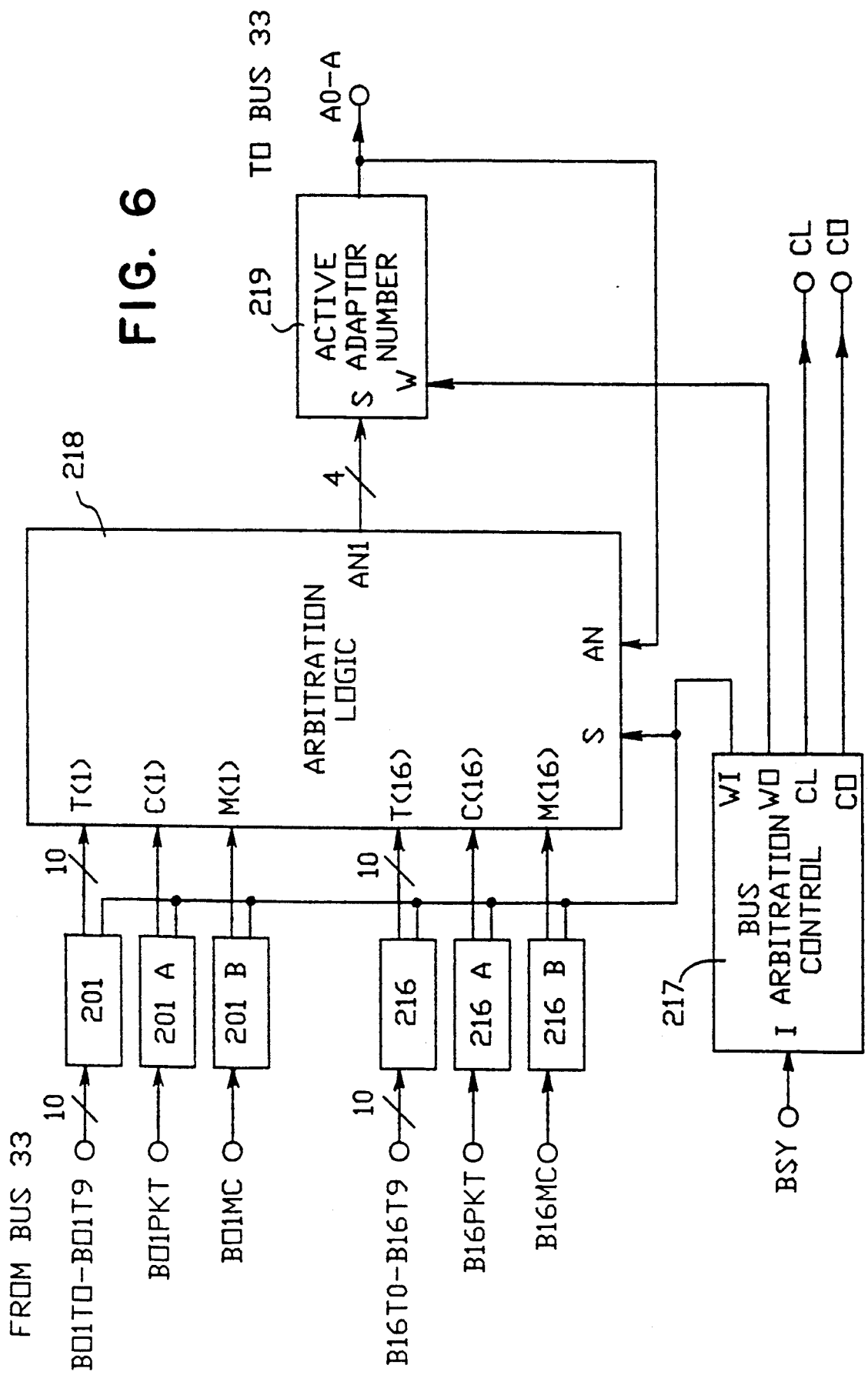
FIG. 6. is a schematic representation of the bus arbitration unit for the FULL Algorithm.

We turn now to FIG. 6 which illustrates the internal structure of Bus Arbitration Unit 34 with the FULL algorithm, and since it is very similar to the one in FIG. 3 (using the MIN algorithm) we will describe only the differences between the two.

Port B01MC is connected by the Bus to port A01MC (FIG. 5) of Input Adaptor 1, and similarly for the other adaptors. Thus, the signal at B01MC will be activated whenever the buffer on Input Adaptor 1 contains M or more bytes. The bit corresponding to this signal is stored in Latch 201B under the control of Bus Arbitration Unit 217, through the signal at its WI output. The corresponding bits for the other adaptors are similarly stored in Latches 202B through 216B. The output of these latches are made available to Arbitration Logic 218 at its M(1) through M(16) inputs. Arbitration Logic 218 consists of circuitry which selects the buffer to be served next according to the FULL algorithm (see FIG. 7 below).

Figure 7:
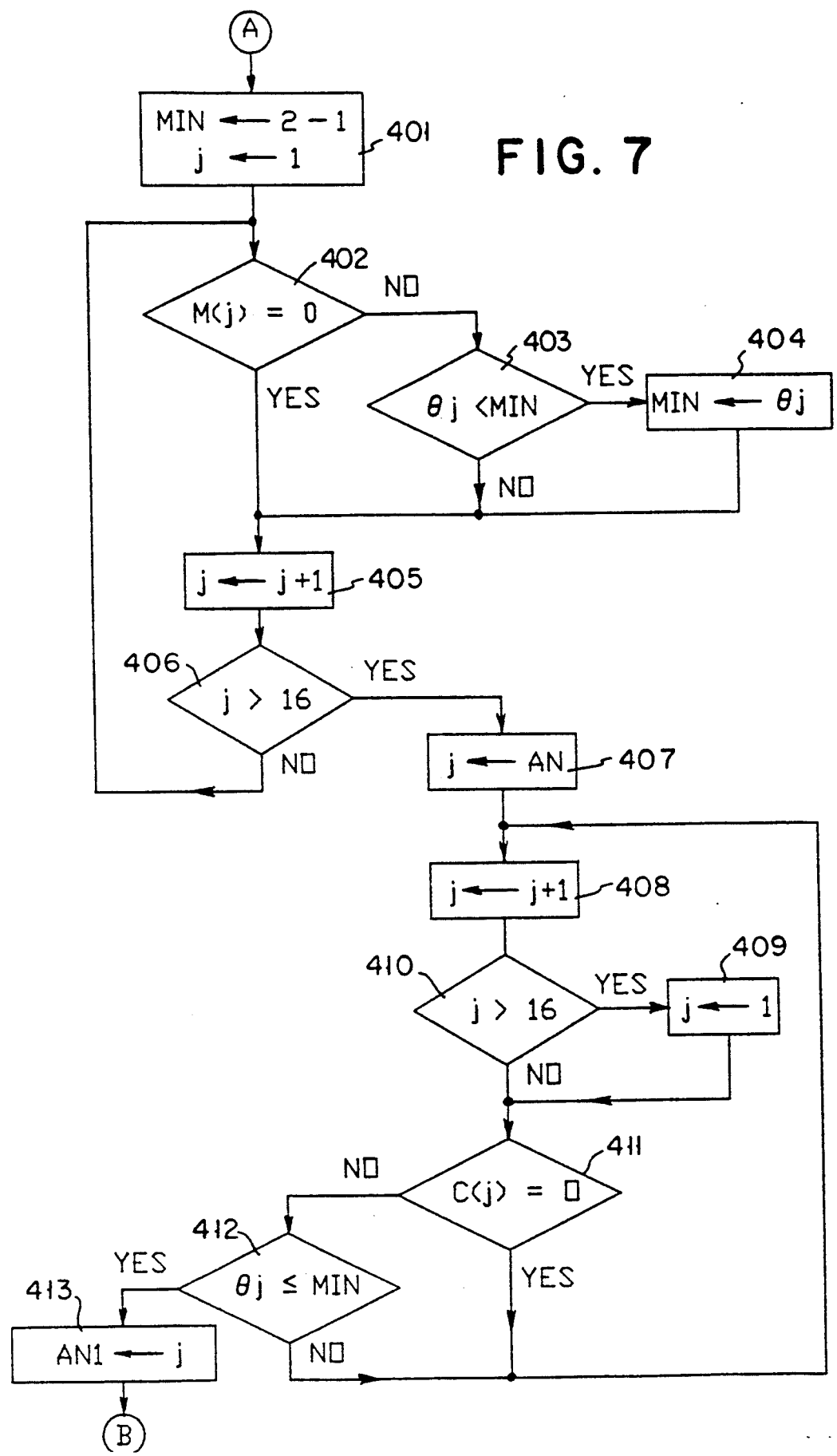
FIG. 7. is the flowchart for the arbitration logic for the FULL Algorithm.

We turn now to FIG. 7 which illustrates in block diagram form the FULL algorithm implemented by Arbitration Logic 218 of FIG. 6. Here $\theta_1$ through $\theta_{16}$ represent the values at inputs T(1) through T(16) of FIG. 3, C(1) through C(16) represent the values at inputs C(1) through C(16) of FIG. 6.while M(1) through M(16) represent the values at inputs M(1) through M(16) of FIG. 6 (the value is 1 if the corresponding input signal is activated). AN and AN1 represent the values at input AN and output AN1, respectively, of FIG. 6. The symbols j and MIN are variables used in the computation: j takes values 1 through 16 while MIN is used to calculate the minimum TRB value from a set of TRB's. The computation, which is performed repetitively under the control of Bus Arbitration Control 217 of FIG. 6, starts at A. The block diagram in FIG. 7 is similar to the one in FIG. 4 with only minor differences as detailed below. At step 402 the condition tested is whether M(j) is equal to zero, as opposed to testing whether C(j) is equal to zero as done at step 302 of FIG. 4. Following step 306 the value of MIN is $\theta_F$. At step 412 the condition tested is whether T(I) is larger or equal to MIN, as opposed to testing whether T(I) is equal to MIN as done at step 312 of FIG. 4. Following step 306 the value of MIN is $\theta_F$. At step 412 the condition tested is whether $\theta_j$ is larger or equal to MIN, as opposed to testing whether $\theta_j$ is equal to MIN as done at step 312 of FIG. 4.

In the packet switching device described above all the input adaptors, such as Input Adaptor 1 in FIG. 1, have an associated input link on which packets arrive at the buffer system. In some other application we could have a situation where some of the buffers within the buffer system have an associated input link for incoming packets while others have an output link for outgoing packets. The service provided by the server would be, in the former case, emptying the buffer and, in the latter case, filling the buffer. For the latter case, implementation of such a system could be based on the design in FIGS. 2 through 7. Only minor changes to the design would be required as outlined below.

For the latter case, FIGS. 3,4,6 and 7 would remain unchanged. FIGS. 2 and 5 would remain unchanged for a buffer with an input link but would require minor alterations for a buffer with an output link as follows. Referring to FIG. 2, the incoming link becomes an outgoing link and Send Control 106 now controls the transfer of bytes from the Bus (ports A01P0 through A01P7) to the outgoing link (port LIN(1)). As a result the direction of the arrow on the data path is now reversed. For example, bytes now travel from ports A01P0 through A01P7 to input O (formerly output O) of Latch 107, and from output I (formerly input I) of Latch 107 to input O (formerly output O) of Packet FIFO 103. Similarly, EC and PE outputs of Send Control 106 now travel to input BO and EO, respectively, of Delimiter FIFO 104. Inputs BI and EI of Delimiter FIFO 104 now become outputs with the appropriate reversal of direction on their respective links. Input BCL of Receive Control 102 now becomes an output which controls the timing of the output link through Serial Receiver 101. Input I of Packet FIFO 103 becomes an output, outputs P, PB, PE and BCL of Serial Receiver 101 become inputs. The same identical changes are made to FIG. 5 for the FULL algorithm.

In the preferred embodiment described above we have assumed that b=10 the number of bits in TRB Counter 110 (FIG. 2). In addition we have assumed that speed $S_i$ of link i is a multiple of $S_F$, $i=1, \ldots, 16$. The consequence of these assumptions is that the policy implemented by the preferred embodiment is an approximation of the LTRB policy as stated in the section Summary of the Invention. This preferred embodiment should be satisfactory in most practical cases. If desired, however, the accuracy of the implementation could be significantly increased as follows.

By increasing the value b, the number of bits of the TRB Counter 110, it is possible to make the error caused by limiting this number of bits arbitrarily small. A different approach is also possible, one which does not calculate the TRB's at all. Specifically, assume that adaptor i has $Q_i$ bytes in the Packet FIFO. Comparing the TRB's of adaptors i and j means comparing $2M - Q_i/S_i$ vs. $2M - Q_j/S_j$. This is equivalent to comparing $(2M - Q_i)S_j$ vs. $(2M - Q_j)S_i$, an operation which may involve multiplications and thus may be less efficient than the one described in the preferred embodiment, but one which can be done exactly. The procedure is then to perform up to 15 comparisons and thus find the smallest TRB.

REFERENCES

[1] A. Abo-Taleb and H. T. Mouftah, "Delay analysis under a general cut-through switching technique in computer networks," *IEEE Trans. on Communications*, vol. COM-35, pp. 356–359, March 1987.

[2] I. Cidon, I. Gopal, G. Grover and M. Sidi, "Real time packet switching: a performance analysis," *IEEE J.Select.Areas Commun.*, vol. SAC-6, pp 1576–1586, December 1988.

Having thus described our invention, what we claim as new and desire to secure by Letters Patents is:

1. In a buffer system connected to N links, with each link j of said links being associated with a distinct corresponding buffer j, with x links of said links being input links and with N−X links of said links being output links, said system thus having N buffers, a method of serving said buffers comprising:

a) determining $\theta_M$ where $\theta_M$ is the minimum value of $\theta_i$ for a subset of said N buffers, where each buffer in said subset has at least an essentially complete packet therein if bits are arriving in said each buffer from its associated input link of said links, and where each buffer in said subset has essentially sufficient free storage if bits are departing from said each buffer and onto its associated output link of said links, where $\theta_j$ is the time needed for the j-th buffer to reach its bound if bits are arriving in said j-th buffer from its associated input link of said links, and where $\theta_j$ is the time needed for the j-th buffer to become empty continuously arrive in or if bits depart from said j-th buffer at a constant link speed of said j-th buffer's associated link; and b) serving any of said N buffers of said subset having a value of $\theta_j = \theta_M$, where serving a buffer comprises taking bits out of a buffer associated with an input link and where serving a buffer comprises storing bits in a buffer associated with an output link.

2. A method as recited in claim 1, wherein each buffer has a buffer size of at least 2M, where M is the maximum packet size transmitted through said system.

3. A method as recited in claim 1, wherein each buffer has a buffer size of 2M, where M is the maximum packet size transmitted through said system.

4. In a buffer system connected to N links, with each link j of said links being associated with a distinct corresponding buffer j, with x links of said links being input links and with N−x links of said links being output links, said system thus having N buffers, a method of serving said buffers comprising:

a) determining $\theta_F$ where $\theta_F$ is the minimum value of $\theta_j$ for a subset of said N buffers, where each buffer in said subset has at least M bytes therein if bits are arriving in said each buffer from its associated input link of said links, and where each buffer in said subset has at least m bytes of free storage if bits are departing from said each buffer onto its associated output link of said links, where $\theta_j$ is the time needed for the j-th buffer to reach its bound if bits are arriving in the j-th buffer from its associated input link of said links, and where $\theta_j$ is the time needed for the j-th buffer to become empty if bits are departing from the j-th buffer onto its associated output link of said links, with $\theta_j$ being calculated assuming that bits continuously arrive in or depart from said j-th buffer at a constant link speed of said j-th buffer's associated link; and b) serving a selected buffer of said buffers having a value of $\theta_j \leq \theta_F$, having essentially sufficient free storage if bits are departing from said selected buffer and onto its associated output link of said links, and having at least an essentially complete packet in said selected buffer if bits are arriving in said selected buffer from its associated input link of said links.

5. A method as recited in claim 4, wherein each buffer has a buffer size of at least 2M, where M is the maximum packet size transmitted through said system.

6. A method as recited in claim 4, wherein each buffer has a buffer size of 2M, where M is the maximum packet size transmitted through said system.

7. In a buffer system connected to N links, with each link j of said links being associated with a distinct corresponding buffer j, with x links of said links being input links and with N−x links of said links being output links, said system thus having N buffers, an apparatus for serving said buffers comprising:

a) means for determining $\theta_M$ where $\theta_M$ is the minimum value of $\theta_j$ for a subset of said N buffers, where each buffer in said subset has at least an essentially complete packet therein if bits are arriving in said each buffer from its associated input link of said links, and where each buffer in said subset has essentially sufficient free storage if bits are departing from said each buffer and onto its associated output link of said links, where $\theta_j$ is the time needed for the j-th buffer to reach its bound if bits are arriving in said j-th buffer from its associated input link of said links, and where $\theta_j$ is the time needed for the j-th buffer to become empty if bits are departing from the j-th buffer onto its associated output link of said links, with $\theta_j$ being calculated assuming that bits continuously arrive in or depart from said j-th buffer at a constant link speed of said j-th buffer's associated link; and b) means for serving any of said N buffers of said subset having a value of $\theta_j = \theta_M$, where serving a buffer comprises taking bits out of a buffer associated with an input link and where serving a buffer comprises storing bits in a buffer associated with an output link.

8. An apparatus as recited in claim 7, wherein each buffer has a buffer size of at least 2M, where M is the maximum packet size transmitted through said system.

9. An apparatus as recited in claim 7, wherein each buffer has a buffer size of 2M, where M is the maximum packet size transmitted through said system.

10. In a buffer system connected to N links, with each link j of said links being associated with a distinct corresponding buffer j, with x links of said links being input links and with N−x links of said links being output links off said system thus having N buffers, an apparatus for serving said buffers comprising:

a) means for determining $\theta_F$ where $\theta_F$ is the minimum value of $\theta_j$ for a subset of said N buffers, where each buffer in said subset has at least M bytes therein if bits are arriving in said each buffer from its associated input link of said links, and where each buffer in said subset has at least M bytes of free storage if bits are departing from said each buffer onto its associated output link of said links, where $\theta_j$ is the time needed for the j-th buffer to reach its bound if bits are arriving in the j-th buffer from its associated input link of said links, and where $\theta_j$ is the time needed for the j-th buffer to become empty if bits are departing from the j-th buffer onto its associated output link of said links, with $\theta_j$ being calculated assuming that bits continuously arrive in or depart from said j-th buffer at a constant link speed of said j-th buffer's associated link; and b) means for serving a selected buffer of said buffers having a value of $\theta_j \leq \theta_F$, having essentially sufficient free storage if bits are departing from said selected buffer and onto its associated output link of said links, and having at least an essentially complete packet in said selected buffer if bits are arriving in said selected buffer from its associated input link of said links.

11. An apparatus as recited in claim 10, wherein each buffer has a buffer size of at least 2M, where M is the maximum packet size transmitted through said system.

12. An apparatus as recited in claim 10, wherein each buffer has a buffer size of 2M, where M is the maximum packet size transmitted through said system.

13. In a buffer system connected to N input links, with each link j of said links corresponding to a buffer j, said system thus having N input buffers, a method of serving said buffers comprising:

a) determining $\theta_M$ if there is at least one of said N buffers which has an essentially complete packet therein, where $\theta_m$ is the minimum value of $\theta_j$ for a subset of said N buffers, where each buffer in said subset has at least an essentially complete packet therein, and where $\theta_j$ is the time needed for the j-th buffer to reach its bound, with $\theta_j$ being calculated assuming that bits continuously arrive in or depart from said j-th buffer at a constant link speed of said j-th buffer's associated link; and b) serving any of said N buffers of said subset having a value of $\theta_j = \theta_M$.

14. A method as recited in claim 13, wherein each buffer has a buffer size of 2M, where M is the maximum packet size transmitted through said system.

15. A method as recited in claim 13 where $\theta_j$ is the time needed for the j-th buffer to reach its bound if no service is provided to the j-th buffer and bits continuously arrive on the j-th input link and into said j-th buffer.

16. In a buffer system connected to N input communication links with each link j of said links corresponding to a buffer j said system thus having N input buffers, a method of serving said buffers comprising:

a) determining $\theta_F$ if there is at least one of said N buffers which has at least M bytes therein, where $\theta_F$ is the minimum value of $\theta_j$ for a subset of said N buffers, where each buffer in said subset has at least M bytes therein, where $\theta_j$ is the time needed for the j-th buffer to reach its bound, and where M is the maximum packet size in bytes transmitted through said device, with $\theta_j$ being calculated assuming that bits continuously arrive in or depart from said j-th buffer at a constant link speed of said j-th buffer's associated link; and b) serving any of said buffers having an essentially complete packet therein and having a value of $\theta_j \leq \theta_F$, if $\theta_F$ is determined in step (a).

17. A method as recited in claim 16, wherein each buffer has a buffer size of 2M, where M is the maximum packet size transmitted through said system.

18. A method as recited in claim 16 where $\theta_j$ is the time needed for the j-th buffer to reach its bound if no service is provided to the j-th buffer and bits continuously arrive on the j-th input communications link and into said j-th buffer.

19. In a switching device connected to N input communication links, with each link j of said links corresponding to a buffer j, said device thus having N input buffers, a method of serving said buffers comprising:

a) determining $\theta_F$ if there is at least one of said N buffers which has at least M bytes therein, wherein $\theta_F$ is the minimum value of $\theta_j$ for a subset of said N buffers, where each buffer in said subset has at least M bytes therein, where $\theta_j$ is the time needed for the j-th buffer to reach its bound, and where M is the maximum packet size in bytes transmitted through said device, with $\theta_j$ being calculated assuming that bits continuously arrive in or depart from said j-th buffer at a constant link speed of said j-th buffer's associated link;

b) serving any of said buffers having an essentially complete packet therein and having a value of $\theta_j \leq \theta_F$, if $\theta_F$ is determined in step a); and c) serving any of said N buffers having an essentially complete packet therein if no one of said N buffers has at least M bytes therein.

20. In a buffer system connected to N input links, with each link j of said links corresponding to a buffer j, said system thus having N input buffers, an apparatus for serving said buffers comprising:

a) means for determining $\theta_M$ if there is at least one of said N buffers which has an essentially complete packet therein, where $\theta_M$ is the minimum value of $\theta_j$ for a subset of said N buffers, where each buffer in said subset has at least an essentially complete packet therein, and where $\theta_j$ is the time needed for the j-th buffer to reach its bound, with $\theta_j$ being calculated assuming that bits continuously arrive in or depart from said j-th buffer at a constant link speed of said j-th buffer's associated link; and b) means for serving any of said N buffers of said subset having a value of $\theta_j = \theta_M$.

21. An apparatus as recited in claim 19, wherein each buffer has a buffer size of 2M where M is the maximum packet size transmitted through said device.

22. In a buffer system connected to N input communication links with each link j of said links corresponding to a buffer j, said system thus having N input buffers, an apparatus for serving said buffers comprising:
  a) means for determining $\theta_F$ if there is at least one of said N buffers which has at least M bits therein, where $\theta_F$ is the minimum value of $\theta_j$ for a subset of said N buffers, where each buffer in said subset has at least M bytes therein, where $\theta_j$ is the time needed for the j-th buffer to reach its bound, and where M is the maximum packet size in bytes transmitted through said device, with $\theta_j$ being calculated assuming that bits continuously arrive in or depart from said j-th buffer at a constant link speed of said j-th buffer's associated link; and
  b) means for serving any of said buffers having an essentially complete packet therein and having a value of $\theta_j \leq \theta_F$, if $\theta_F$ is determined in step (a).

23. An apparatus as recited in claim 21, wherein each buffer has a buffer size of 2M, where M is the maximum packet size transmitted through said device.

24. In a buffer system connected to N input links, with each link j of said links corresponding to a buffer j and having a link speed of $S_j$, said system thus having N input buffers, an apparatus for serving said buffers comprising:
  a) means for determining $\theta_M$ if there is at least one of said N buffers which has an essentially complete packet therein, where $\theta_M$ is the minimum value of $\theta_j$ for a subset of said N buffers, where each buffer in said subset has at least an essentially complete packet therein, where $\theta_j = (2M - Q_j) \div S_j$, where M is the maximum packet size transmitted through said switching device, where $Q_j$ is the number of bytes in the j-th buffer, and where each buffer of said N buffers has a buffer size of 2M bytes; and
  b) means for serving any of said buffers of said subset having a value of $\theta_j = \theta_M$ if $\theta_M$ is determined in step (a).

25. In a buffer system connected to N input links, with each link j of said links corresponding to a buffer j and a link speed of $S_j$, said system thus having N buffers, an apparatus for serving said buffers comprising:
  a) means for determining $\theta_F$ if there is at least one of said N buffers which has at least M bytes therein, where $\theta_F$ is the minimum value of $\theta_j$ for a subset of said N buffers, where each buffer in said subset has at least M bytes therein, where $\theta_j = (2M - Q_j) \div S_j$, where $Q_j$ is the number of bytes in the j-th buffer, where M is the maximum packet size transmitted through said switching device, and where each of said N buffers has a buffer size of 2M bytes;
  b) means for serving any of said N buffers having an essentially complete packet therein and having a value of $\theta_j \leq \theta_F$, if $\theta_F$ is determined.

* * * * *